US011270525B2

(12) United States Patent
Moniot et al.

(10) Patent No.: US 11,270,525 B2
(45) Date of Patent: Mar. 8, 2022

(54) AUTOMATED VEHICLE OCCUPANCY DETECTION

(71) Applicant: Alliance for Sustainable Energy, LLC, Golden, CO (US)

(72) Inventors: Matthew Louis Moniot, Golden, CO (US); Yi Hou, Highlands Ranch, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 42 days.

(21) Appl. No.: 16/675,403

(22) Filed: Nov. 6, 2019

(65) Prior Publication Data

US 2020/0143181 A1    May 7, 2020

Related U.S. Application Data

(60) Provisional application No. 62/782,525, filed on Dec. 20, 2018, provisional application No. 62/756,269, filed on Nov. 6, 2018.

(51) Int. Cl.
| | |
|---|---|
| *G06K 9/00* | (2022.01) |
| *G06V 20/59* | (2022.01) |
| *G06K 9/62* | (2022.01) |
| *G06V 10/143* | (2022.01) |

(52) U.S. Cl.
CPC ......... *G06V 20/593* (2022.01); *G06K 9/6256* (2013.01); *G06V 10/143* (2022.01)

(58) Field of Classification Search
CPC . G06K 9/00838; G06K 9/2018; G06K 9/6256

USPC .......................................................... 382/104
See application file for complete search history.

(56) References Cited

U.S. PATENT DOCUMENTS

| | | | |
|---|---|---|---|
| 4,009,389 A | 2/1977 | Lindholm | |
| 6,919,804 B1 | 7/2005 | Cook et al. | |
| 7,788,063 B2 | 8/2010 | Bodin et al. | |
| 9,934,442 B2 | 4/2018 | Oami et al. | |
| 2009/0192756 A1* | 7/2009 | Bodin | G01G 19/12 |
| | | | 702/129 |
| 2011/0087825 A1* | 4/2011 | Cialini | G06F 13/409 |
| | | | 711/103 |
| 2011/0284329 A1* | 11/2011 | Nakagawa | B66B 1/2458 |
| | | | 187/382 |
| 2012/0133738 A1* | 5/2012 | Hoffmeier | G08G 1/164 |
| | | | 348/46 |
| 2013/0006724 A1 | 1/2013 | Simanek et al. | |
| 2013/0138714 A1* | 5/2013 | Ricci | B60R 7/04 |
| | | | 709/201 |
| 2016/0343175 A1* | 11/2016 | Nyalamadugu | G06Q 20/102 |
| 2016/0350649 A1* | 12/2016 | Zhang | G06N 3/0454 |
| 2018/0065582 A1* | 3/2018 | Miller | B60R 21/01552 |
| 2018/0150704 A1* | 5/2018 | Lee | G06K 9/00805 |
| 2018/0192756 A1* | 7/2018 | Bennett | A45D 1/04 |
| 2019/0065872 A1* | 2/2019 | Yamanaka | B60W 40/09 |

* cited by examiner

*Primary Examiner* — Stephen P Coleman
(74) *Attorney, Agent, or Firm* — Alexandra M. Hall

(57) ABSTRACT

Described herein are systems and methods for detecting the number of occupants in a vehicle. The detecting may be performed using a camera and a processing device. The detecting may be anonymous and the image of the interior of the vehicle is not stored on the processing device.

10 Claims, 7 Drawing Sheets

| | Predicted vs. True | | | | |
|---|---|---|---|---|---|
| 1 | 30 | 0 | 0 | 0 | 0 |
| 2 | 0 | 179 | 0 | 0 | 0 |
| 3 | 0 | 0 | 36 | 0 | 0 |
| 4 | 0 | 0 | 2 | 199 | 0 |
| 5 | 0 | 0 | 0 | 0 | 182 |
| | 1 | 2 | 3 | 4 | 5 |

True Label (y-axis), Predicted Label (x-axis)

FIG. 4

|   | \ | Predicted vs. True | | | |
|---|---|---|---|---|---|
| 1 | 127 | 0 | 0 | 0 | 0 |
| 2 | 0 | 192 | 0 | 0 | 0 |
| 3 | 0 | 0 | 85 | 0 | 0 |
| 4 | 0 | 0 | 2 | 171 | 0 |
| 5 | 0 | 0 | 0 | 0 | 539 |
|   | 1 | 2 | 3 | 4 | 5 |

True Label (y-axis), Predicted Label (x-axis)

FIG. 5

|   | 1 | 2 | 3 | 4 | 5 |
|---|---|---|---|---|---|
| 1 | 28 | 0 | 0 | 0 | 0 |
| 2 | 0 | 44 | 0 | 0 | 0 |
| 3 | 0 | 0 | 7 | 0 | 0 |
| 4 | 0 | 0 | 2 | 192 | 0 |
| 5 | 0 | 0 | 0 | 0 | 173 |

Predicted vs. True (True Label vs. Predicted Label)

FIG. 6

AUTOMATED VEHICLE OCCUPANCY DETECTION

CROSS-REFERENCE TO RELATED APPLICATIONS

This application claims the benefit of U.S. Provisional Application No. 62/756,269 filed on Nov. 8, 2018 and U.S. Provisional Application No. 62/782,525 filed on Dec. 20, 2018, the contents of which are incorporated herein by reference in their entirety.

CONTRACTUAL ORIGIN

The United States has rights in this invention under Contract No. DE-AC36-08GO28308 between the United States Department of Energy and Alliance for Sustainable Energy, LLC, the Manager and Operator of the National Renewable Energy Laboratory.

BACKGROUND

The transportation industry is undergoing rapid transformation. Individually driven trips in privately-owned vehicles are being replaced by commercial services such as ride-hailing and car-sharing. While these trends increase mobility options, current transportation systems are not prepared and may be negatively impacted. Municipalities and other regulatory entities are interested in how these changes result in the movement of people, rather than just vehicles.

Simultaneously to the development of these mobility as a service platforms, autonomous vehicle (AV) technology is rapidly advancing, enabling vehicle operation with zero occupants. AVs represent additional challenges for municipalities, as more zero occupancy vehicles may be added to the roadway system and needlessly cause congestions.

There is little public data regarding vehicle occupancy. Ride sharing companies are interested in measuring the number of passengers served, but currently do not have the means to do so beyond manual counting by the driver or self-reporting by the passengers. Most proposed automated methods invade the privacy of the occupants. Automobile manufacturers do install seat sensors to detect whether a passenger is wearing a seatbelt, but these seat sensors are typically only available in the front seats of vehicles. Occupancy data to measure the utilization of carpooling, ride sharing, public transit, and other forms of transportation requires data regarding the occupants of the entire vehicle. Additionally, occupancy data for vehicles currently on the road is desired, so solutions must be capable of being retrofitted to be utilized in older vehicles.

SUMMARY

An aspect of the present disclosure is a device comprising at least one processor configured to receive an image corresponding to an interior of a vehicle, determine, using a convolutional neural network to analyze the image, an estimate of a number of occupants in the interior of the vehicle, store the estimate of the number of occupants in the interior of the vehicle, and cause a change in a behavior of the vehicle based on the estimate of the number of occupants in the interior of the vehicle. In some embodiments, the convolutional neural network comprises a convolutional layer with a filter, a pooling layer with a pooling region, and a feature map. In some embodiments, the image is captured by a camera. In some embodiments, the camera is an infrared camera. In some embodiments, the camera is an optical camera. In some embodiments, the processor is further configured to delete the image after determining the estimate of the number of occupants in the interior of the vehicle.

Another aspect of the present disclosure is a method comprising utilizing a camera to capture an image of an interior of a vehicle, sending the image to a processor, determining the number of occupants in the interior of the vehicle, storing the number of occupants in the interior of the vehicle, and altering the behavior of the vehicle based on the number of occupants in the interior of the vehicle, wherein the determining is performed by the processor using a convolutional neural network, the camera is positioned within the interior of the vehicle, and the behavior of the vehicle corresponds to at least one of the route, speed, or final destination of the vehicle. In some embodiments, the camera is an infrared camera. In some embodiments, the camera is an optical camera. In some embodiments, the storing comprises saving the number of occupants in the interior of the vehicle in at least one of the processor, a mobile device, or a cloud-based storage system, and deleting the image. In some embodiments, the convolutional neural network comprises a convolutional layer with a filter, a pooling layer with a pooling region, and a feature map.

Another aspect of the present disclosure is a system comprising a camera having a lens which is directed toward an interior of a vehicle, a processor, and a storage device, wherein the camera is configured to capture an image of the interior of the vehicle, the processor is configured to receive the image of the interior of the vehicle, and determine, using a convolutional neural network to analyze the image, an estimate of a number of occupants in the interior of the vehicle. In some embodiments, the processor is further configured to delete the image of the interior of the vehicle after the determining. In some embodiments, the storage device comprises a flash drive which is connected to the processor via a USB port. In some embodiments, the storage device comprises a cloud-based storage system. In some embodiments, the camera is an infrared camera. In some embodiments, the camera is an optical camera.

BRIEF DESCRIPTION OF THE DRAWINGS

Exemplary embodiments are illustrated in referenced figures of the drawings. It is intended that the embodiments and figures disclosed herein are considered to be illustrative rather than limiting.

FIG. 4 is a confusion matrix demonstrating convolutional neural network accuracy for passenger counting from a set of infrared images. The predicted label represents model predictions while the true label represents actual vehicle occupancy.

FIG. 5 is a confusion matrix demonstrating convolutional neural network accuracy for passenger counting from a set of optical images.

FIG. 6 is a confusion matrix demonstrating convolutional neural network accuracy for passenger counting from a set of night vision images.

DETAILED DESCRIPTION

The present disclosure provides devices capable of utilizing deep learning techniques for determining the number of occupants in a vehicle. For instance, the techniques described herein may be used to determine the number of occupants in a vehicle being used for taxi, carpooling, vanpooling, or ride-share purposes. The number of occupants in the vehicle may be used to determine vehicle routes, optimize the flow of passengers, or schedule pick-ups and/or drop offs.

The deep learning techniques may require the use of two devices: a camera and a computer. The camera functions within the vehicle, capturing images of the interior of the vehicle. These images may then be fed into an onboard computer and/or processor which may process images and detect the number of passengers using a convolution neural network (CNN). The CNN process may anonymize results, translating the images into numbers of passengers. These numbers may be stored in the computer, transmitted to another device (such as a mobile device or laptop), reported to a central command station, or stored in the cloud. The images are not be saved—the only information saved is the number of passengers, not the images. This allows for the identity of passengers in the vehicle to be kept confidential, even if the image is of a quality which would allow for facial recognition.

The camera may be an infrared camera, an optical camera, night vision camera, thermal imaging camera, or another type of camera. The methods described herein may be utilized using any type of camera. The type of camera does not impact the method used to determine the number of passengers. Reasons for selecting different types of cameras may be related to seeking passenger privacy, cost, or visibility capabilities within the vehicle. In some embodiments multiple types of cameras may be used so that the number of passengers may be determined in multiple lighting situations.

In some embodiments, the camera may be located on the dashboard or instrument panel of the car. In such instance, the techniques described herein may be incorporated into existing dashboard cameras, increasing their functionality. In some embodiments, the camera may be located on the side or ceiling of the interior/cabin of the vehicle. In other embodiments, the camera may be located on the rear-facing portion of the headrest of the front-row seats (this would allow the camera to capture only images of the passengers in the rear seats). Some embodiments may use multiple cameras located at various points within the vehicle to capture multiple images to determine the number of passengers. In such instance, the multiple images may be analyzed separately and the total number of passengers determining by summing the number of passengers in each image.

Figure 1:
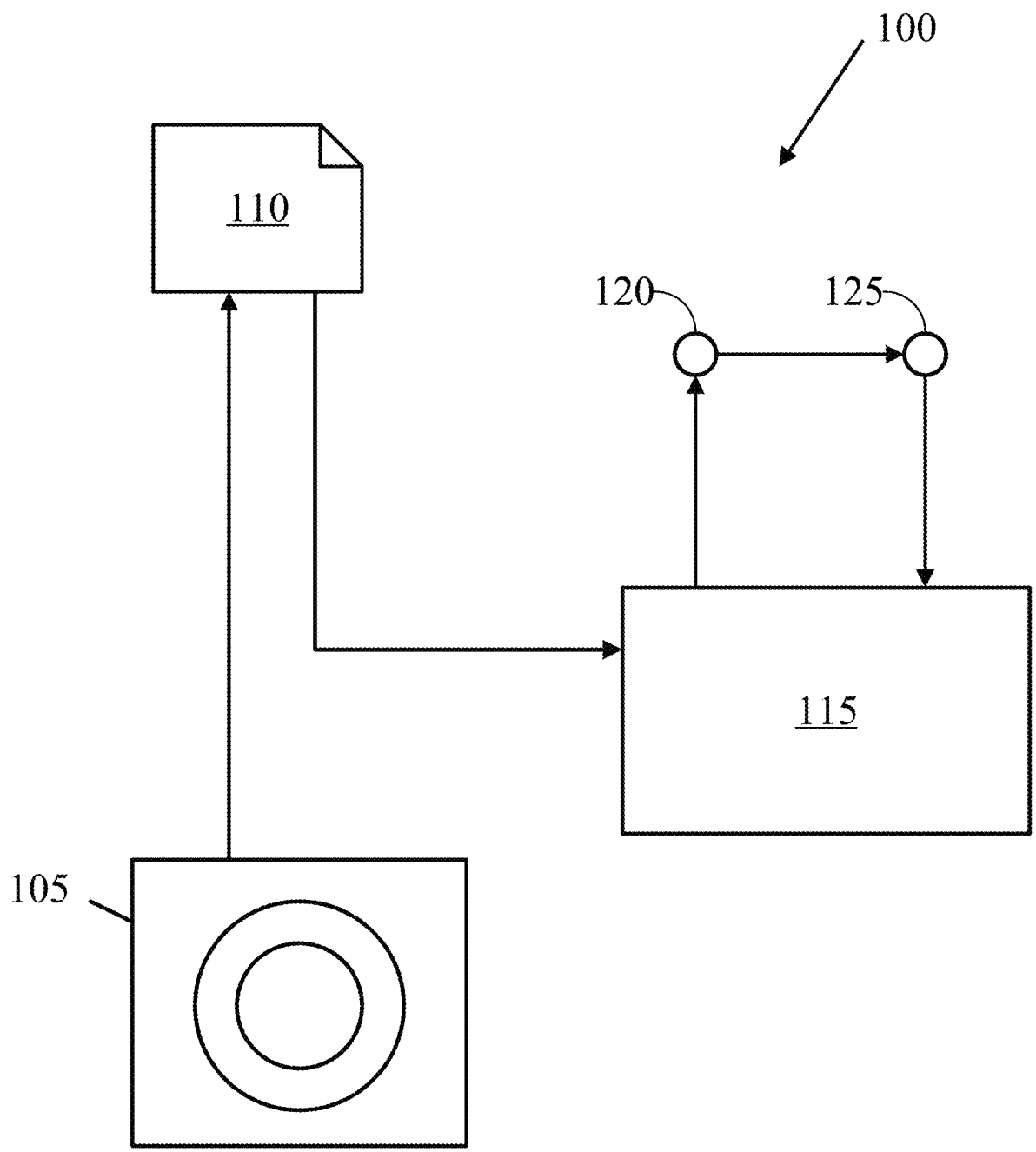
FIG. 1 is a conceptual diagram illustrating an example vehicle occupancy detection system configured to determine the number of passengers in a vehicle, in accordance with one or more aspects of the present disclosure.

FIG. 1 is a conceptual diagram illustrating an example vehicle occupancy detection system (i.e., system 100) configured to determine the number of passengers in a vehicle, in accordance with one or more aspects of the present disclosure. The system 100 includes a camera 105, which is oriented within the vehicle so as to capture an image 110 of the passengers within the vehicle. The image 110 is sent from the camera 105 to a processor 115. The processor 115 may be within the camera 105 or may be a separate device. The processor 115 uses a convolutional neural network (CNN) 120 to detect features indicating the presence of passengers in the image 110. With the results from the CNN 120 the processor 115 determines the number of passengers 125 within the vehicle. Information about the number of occupants in the vehicle 125 may be sent to cloud storage, a mobile device, or stored in the processor 115.

The processor 115 is an onboard computer. The processor 115 may be a Raspberry Pi or other single-board computer. Both the camera 105 and the processor 115 may be auxiliary loads, receiving power from the vehicle in an automated fashion through a cable or having power stored within a battery or batteries. The cable may be attached to a universal serial bus (USB) portal or the cigarette lighter of the vehicle. The system 100 functions while the vehicle is turned on (i.e., from key-on to key-off) without requiring input from the occupants of the vehicle. The system 100 is vehicle agnostic, meaning it requires no specific component or platform support from the vehicle. The system 100 may receive power in an automated fashion from the vehicle irrespective of the vehicle's powertrain (i.e., gasoline vs. electric vehicles) and vehicle class (i.e., sedan, sports utility vehicle (SUV), truck, etc.). In some embodiments, the system 100 may have a battery backup system which may be used if the vehicle suddenly loses power or the connection with the vehicle is detached.

Figure 2:
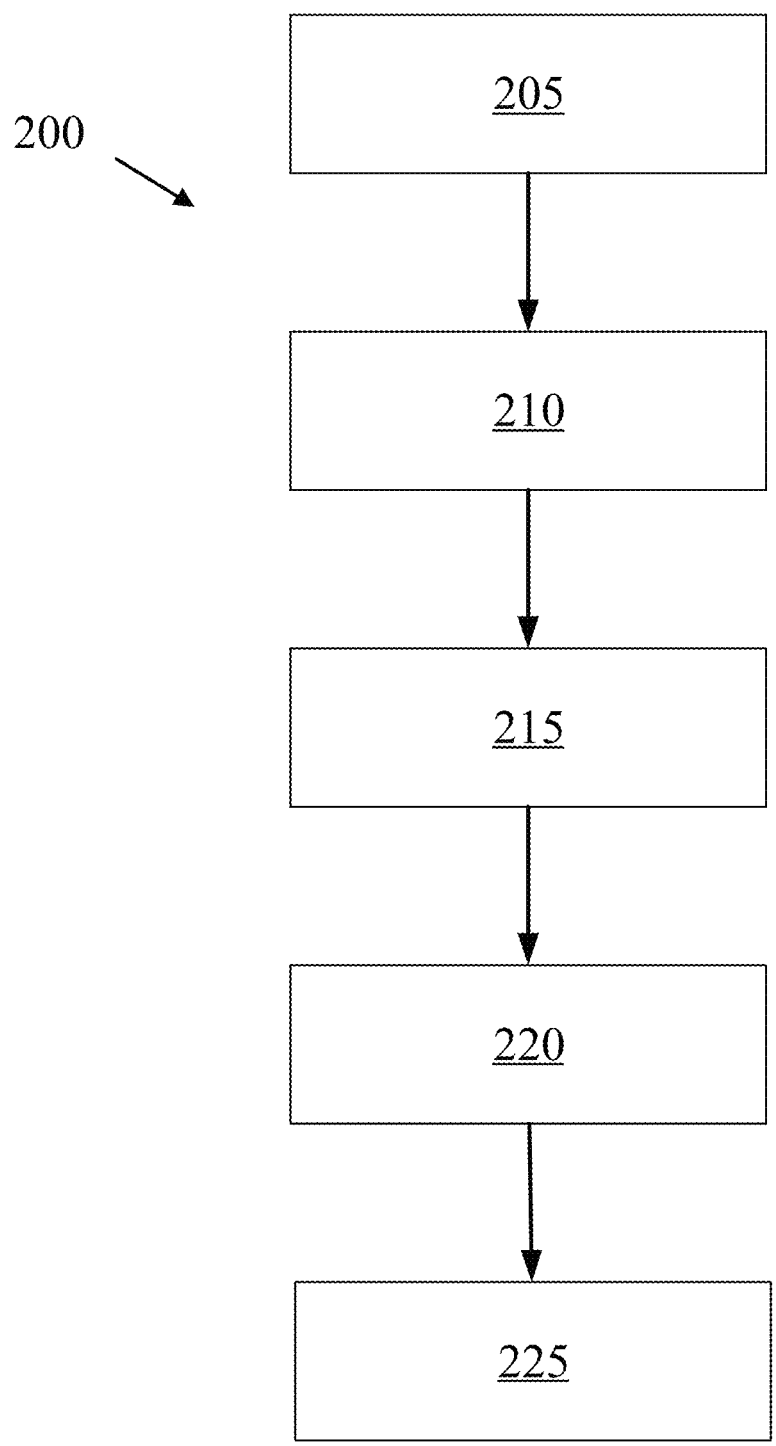
FIG. 2 is a flow diagram illustrating example operations for determining the number of occupants of a vehicle, in accordance with one or more aspects of the present disclosure.

FIG. 2 is a flow diagram illustrating example operations for determining the number of occupants of a vehicle, in accordance with one or more aspects of the present disclosure. The example operations of FIG. 2 (i.e., the method for determining the number of occupants in a vehicle 200) are described below within the context of FIG. 1.

In the example of FIG. 2, the first step of the method of determining the number of occupants of a vehicle 200 is a camera capturing an image of the interior/cabin of a vehicle (205). In the system 100, of FIG. 1, for example, the camera 105 may take an image (or a photograph) 110 of the occupants of the vehicle. In some embodiments, multiple images 110 may be taken to capture all occupants and/or to ensure a high-quality image is captured.

In the example of FIG. 2, the second step of the method of determining the number of occupants of a vehicle 200 is the camera sending the image of the interior of the vehicle to a processor (210). In the system 100, of FIG. 1, for example, camera 105 sends image 110 to the processor 115. The processor 115 receives but does not necessarily store the image 110.

In the example of FIG. 2, the third step of the method of determining the number of occupants of a vehicle 200 is analyzing the image to determine the number of passengers in the vehicle using the processor (215). In the system 100, of FIG. 1, for example, processor 115 uses a convolutional neural network (CNN) 120 to analyze the image 110 for features identifying passengers within the vehicle. The convolutional layers of a CNN enable the capture of the local feature image of the data and reduce model parameters that need to be estimated. The number of convolutional layers, the number of hidden neurons in each layer, convolutional layer kernel size, convolutional layer stride, activation function type, number of epochs, and batch size are all tuned to identify passengers within the vehicle's cabin. The CNN analyzes the image and creates an output of the number of passengers in the vehicle 125.

In the example of FIG. 2, the fourth step of the method of determining the number of occupants of a vehicle 200 is storing the number of passengers in the vehicle (220). The number of passengers may be stored either in the processor, in a separate device, or in the cloud. In the system 100, of FIG. 1, for example, the number of passengers 125 is stored in the processor 115. However, in other embodiments the number of passengers could be stored in a mobile device, in a separate processor, on a USB or other storage device, or in the cloud. In still other embodiments, the number of passengers may be reported back to a central command center which determines and/or schedules vehicle routes.

In the example of FIG. 2, the fifth step of the method of determining the number of occupants of a vehicle 200 is altering the behavior of the vehicle based on the number of passengers in the vehicle (225). The altering may include: planning for tomorrow/future trips or routes, repeating the route, scheduling a second vehicle to repeat the route, calculating the ride cost for each individual passenger, change the temperature of the interior of the vehicle, plan a stop/cessation of the route, and/or receive instructions from a central command center. The vehicle's route or time of departure from its next stop may be altered based on the number of passengers in the vehicle. For example, if the vehicle is empty, the vehicle may wait at its next stop for a passenger. In another example, the vehicle may repeat its same route if it has a large number of passengers. Traffic congestion and vehicle performance may be optimized based on the number of passengers in the vehicle. That is, a vehicle without passengers may get off the roads to avoid "deadheading" and a vehicle with many passengers may contact other vehicles/drivers to handle the increased load.

Figure 3A:
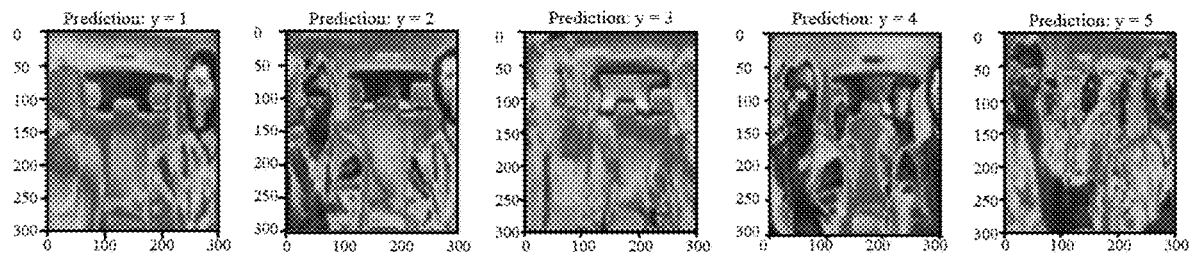
FIG. 3A is infrared images and corresponding occupancy predictions using the methods described herein.
Figure 3B:
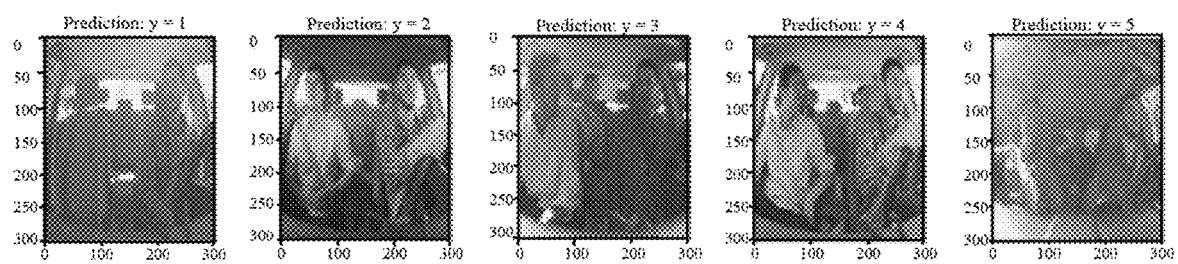
FIG. 3B is optical images and corresponding occupancy predictions using the methods described herein.
Figure 3C:
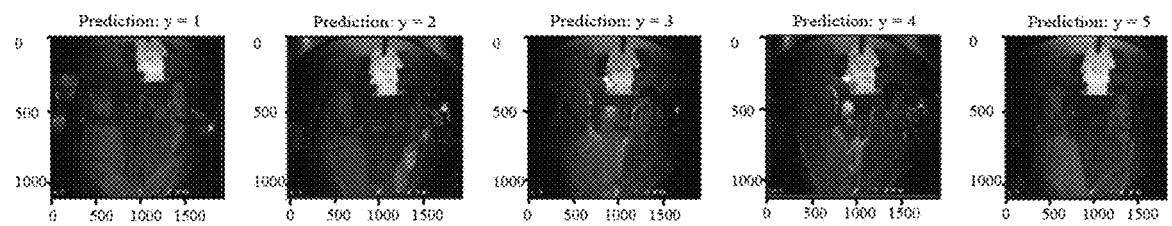
FIG. 3C is night vision images and corresponding occupancy predictions using the methods described herein.

FIG. 3A is infrared images and corresponding occupancy predictions using the methods described herein. FIG. 3B is optical images and corresponding occupancy predictions using the methods described herein. FIG. 3C is night vision images and corresponding occupancy predictions using the methods described herein. The occupancy predictions in FIGS. 3A-C range from one (1) to five (5) passengers in the vehicle. The images in FIG. 3A-C were taken by a camera situated on the dashboard of a vehicle, although in some embodiments a camera may be situated in other locations in the vehicle. An advantage to using an infrared camera (or other similar camera such as thermal imaging or night vision) is that the identity of the passengers is not ascertainable from the image captured by the camera. The methods described herein work effectively on infrared cameras, optical cameras, and night vision cameras, as shown in FIGS. 3A-C.

The CNN model may be trained using images from a variety of vehicle interiors for model training. The vehicles may have various powertrain types, makes and models, occupant seating locations, and occupant demographics and number. Images such as FIGS. 3A-C may be used as input in the CNN model for calculation of the weights that may be used by the onboard processor. A portion of the images may be withheld from the model training and used to test the model. The model performance may be evaluated a confusion matrix, which is a matrix showing many data points were predicted correctly for each class. The training images will correspond to the type of camera used (i.e., for an optical camera, optical images will be used for training). The training will include teaching the CNN model to recognize human shapes and/or features, such as eyes, heads, shoulders, etc.

FIG. 4 is a confusion matrix demonstrating convolutional neural network accuracy for passenger counting from a set of infrared images. That is, the images were captured using an infrared camera and used to test an already trained CNN model. The predicted label represents model predictions while the true label represents actual vehicle occupancy. The confusion matrix in FIG. 4 indicates that only two infrared images were misclassified, leading to a prediction accuracy of 99.7%. The infrared images from FIG. 3A were input in the model, which correctly predicted the number of occupants in the vehicle 99.7% of the time. Note that a separate set of images containing sample images with zero occupants was also trained on the model, however this image is not shown in FIG. 3A.

FIG. 5 is a confusion matrix demonstrating convolutional neural network accuracy for passenger counting from a set of optical images. That is, the images were captured by an optical camera, such as the images in FIG. 3B. In FIG. 5, the predicted label represents model predictions while the true label represents actual vehicle occupancy in each image. The confusion matrix of FIG. 5 indicates the optical camera model accurately predicted the number of occupants in the vehicle.

FIG. 6 is a confusion matrix demonstrating convolutional neural network accuracy for passenger counting from a set of night vision images. That is, the images were captured by a night vision camera, such as the images in FIG. 3C. The confusion matrix of FIG. 6 indicates that only two night vision images were misclassified, leading to a prediction accuracy of 99.6%. The night vision images from FIG. 3C were used as an input in the CNN model, which correctly recognized the number of passengers 99.6% of the time. Note that a separate set of images containing sample images with zero occupants was also trained in the model, however an image with no occupants is not shown in FIG. 3C. Other cameras not described herein may also be used with the CNN to determine the total occupancy in the vehicle. Other cameras may be trained in the same way as the infrared, optical, and night vision camera described herein.

The CNN training process utilized high performance computing to calculate weighting coefficient values used by the onboard processor. While the training process is computationally expensive, however, utilization of the pretrained model requires minimal resources and may be performed onboard in real time. The models used to determine the confusion matrixes of FIG. 4-6 used over 2000 images for training, then tested over 400 images to verify the effectiveness of the model.

The processor performs onboard occupancy detection using a CNN, which is an image recognition algorithm that may be used to create computer vision. A CNN allows a computer to accurately identify and classify features within an image, allowing for sorting or other applications. Using a CNN for vehicle occupancy detection as described herein is computationally inexpensive and may be performed in real time. Anonymous results may be stored as numerical values representing the number of occupants, removing any risk of privacy concerns related to the identities of the passengers. Further, the image used to determine the number of occupants may be "deleted" or not stored in the processor or in another way. The numerical results for the number of passengers within the vehicle may be stored in a variety of ways, including onboard in the processor, in a cloud-based storage service, or on a mobile device. This may allow for the observation of trends of number of passengers in the vehicle at any given time or day.

Figure 7:
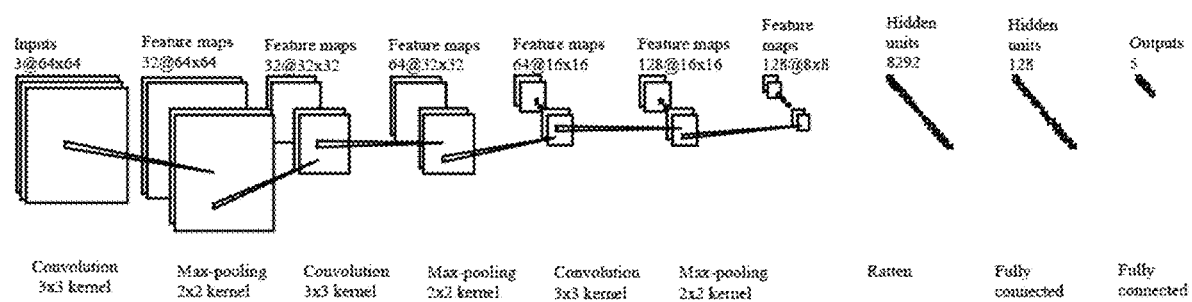
FIG. 7 illustrates the structure of the CNN as used in some example calculations described herein.

FIG. 7 illustrates the structure of the CNN as used in some example calculations described herein. The CNN is utilized by the processor for translating images of the interior of the vehicle into numerical estimates of the number of passengers. The convolutional layers of a CNN enable CNN to capture the local feature image of the data and reduce model parameters that need to be estimated. Convolutional layers capture the local feature of the image data and may reduce model parameters that need to be estimated. Implementation of the CNN requires defining many hyperparameters for optimized accuracy. These may include the number of CNN layers, the number of hidden neurons in each layer, convolutional layer kernel size, convolutional layer stride, activation function type, number of epochs, and batch size. Approximately 10% of training data may be used for validation in every epoch of the training process. As shown in FIG. 7, the CNN consists of 3 convolutional layers with filters of size 3×3. For each convolution layer, a pooling layer with a pooling region size of 2×2 may be followed. Other embodiments may use larger or smaller numbers of convolutional layers and filter sizes. In some embodiments, the final stage may include two fully-connected layers with 128 and 5 neurons to transform the feature maps to occupancy predictions. The convolutional layer may consecutively transfer the number of feature map depth to 32, 64, or 128. In some embodiments the CNN structure may contain 20 epochs and a batch size of 64.

The system described herein may detect and count passengers in a vehicle in an automated fashion requiring no human input. The CNN anonymizes the saved occupancy information, translating the images into numerical values. In some embodiments, the system may be used to indicate to an autonomous vehicle whether passengers are present in the vehicle. In still other embodiments, the system may verify vehicle occupancy of carpool trips and may be used to incentivize trips with high occupancy. Some embodiments may be used to measure the miles traveled with a passenger (or multiple passengers), the time spent "deadheading" (driving without a passenger), and/or the number of passengers serviced per day.

The examples discussed above are provided for purposes of illustration and are not intended to be limiting. Still other embodiments and modifications are also contemplated. While a number of exemplary aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A method comprising:
utilizing a camera to capture an image of an interior of a vehicle;
sending the image to a processor;
determining an estimate of the number of occupants in the interior of the vehicle;
storing the estimate of the number of occupants in the interior of the vehicle; and
altering a behavior of the vehicle based on the estimate of the number of occupants in the interior of the vehicle; wherein:
the vehicle follows a route having a destination,
the determining is performed by the processor using a convolutional neural network,
the convolutional neural network comprises:
a convolutional layer with a 3×3 filter,
a pooling layer with a 2×2 filter,
a feature map, and
two connected layers configured to transform the feature maps into the estimate of the number of occupants in the interior of the vehicle,
the camera is positioned within the interior of the vehicle, and
the altering comprises at least one of stopping the vehicle at the destination, repeating the route, or starting the route.

2. The method of claim 1, wherein the camera is an infrared camera.

3. The method of claim 1, wherein the camera is an optical camera.

4. The method of claim 1, wherein the storing comprises:
saving the number of occupants in the interior of the vehicle in at least one of the processor, a mobile device, or a cloud-based storage system, and
deleting the image.

5. The method of claim 1, wherein the determining is performed by the processor.

6. The method of claim 1, wherein:
the altering comprises stopping at the destination when the estimate of the number of occupants in the interior of the vehicle is zero.

7. The method of claim 1, wherein:
the altering comprises repeating the route when the estimate of the number of occupants in the interior of the vehicle is greater than one.

8. The method of claim 1, wherein:
the altering comprises starting the route when the estimate of the number of occupants in the interior of the vehicle is greater than zero.

9. The method of claim 8, wherein:
at least one of the two connected layers comprises 128 neurons.

10. The method of claim 8, wherein:
at least one of the two connected layers comprises 5 neurons.

* * * * *